Jan. 22, 1935.  W. M. DUNAGAN  1,989,003
METHOD OF TESTING MATERIALS
Filed April 13, 1931
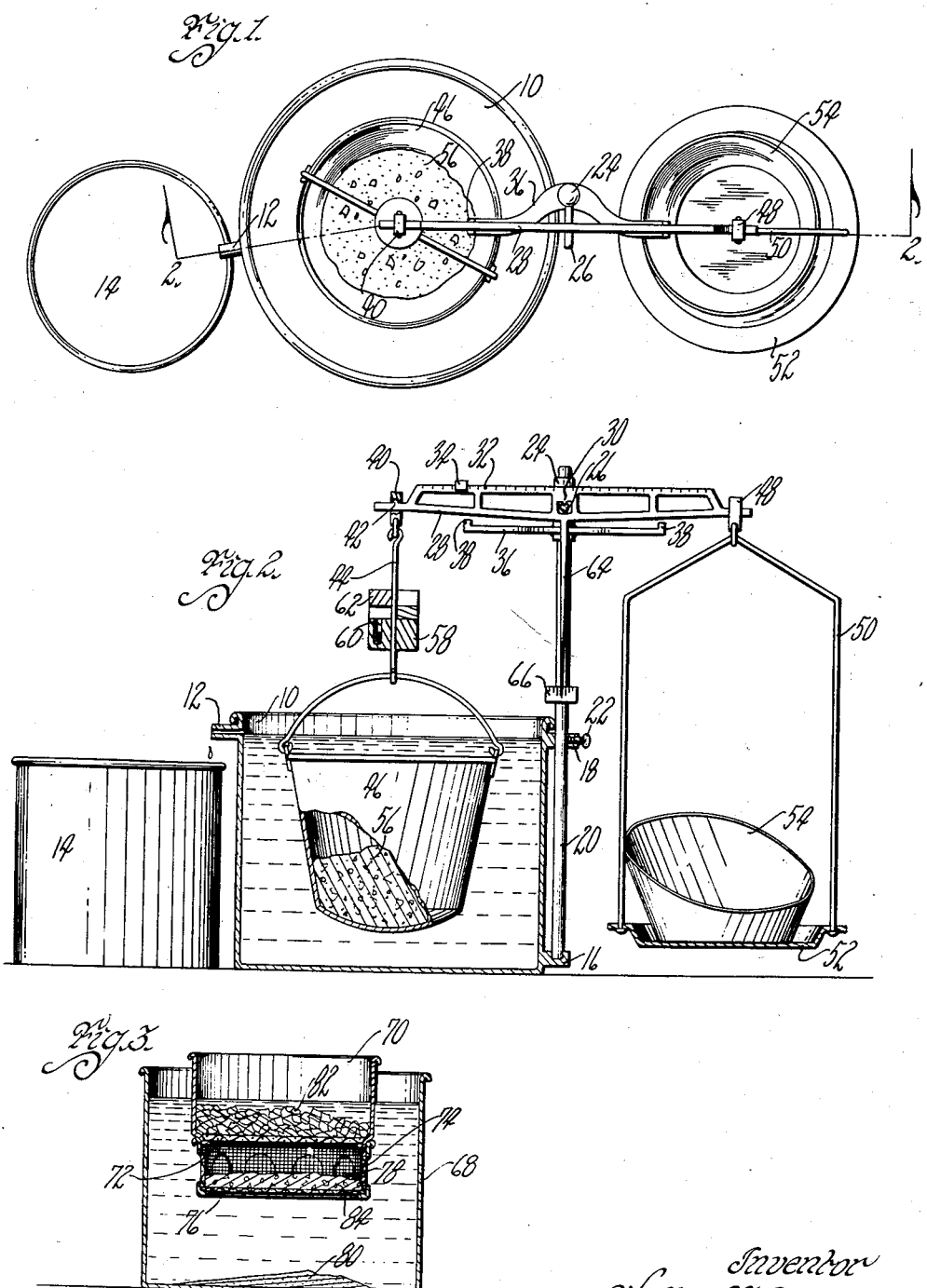

Patented Jan. 22, 1935

1,989,003

UNITED STATES PATENT OFFICE 1,989,003

METHOD OF TESTING MATERIALS

Walter M. Dunagan, Ames, Iowa

Application April 13, 1931, Serial No. 529,556

1 Claim. (Cl. 265—44)

This invention relates to methods for performing certain tests and making certain determinations with respect to the character of mineral aggregates in general and more particularly for aggregates used in making Portland cement concrete, as well as for analyzing the constituents of fresh concrete after mixing.

The proportioning of Portland cement concrete by the weighing of all the ingredients is generally considered to be the most satisfactory method for securing uniform quality; when the aggregates are thus weighed many tests are eliminated and the procedure of introducing the correct amounts of material into the mixer is simplified. With this apparatus and process means are provided for all steps necessary in proportioning by weight and for determining the net weights secured when the proportioning is done by volumes.

In weight proportioning, however, the tests for specific gravity and moisture content of the aggregates become highly important.

One of the objects of the present invention is to provide improved methods or processes of making tests for determining the specific gravity of aggregates as well as free moisture determinations, absorption determinations and determination of the percentage of silt.

Another object is to provide an improved method of accurately and quickly determining the constituents of fresh concrete after mixing.

A further object of the invention is to provide improved apparatus or equipment for making tests and determinations as herein referred to.

Still another object is to provide apparatus for accurately and speedily making such tests with a minimum amount of simple equipment, which is durable and possesses no parts which are breakable under ordinary usage.

Another and further object is to provide apparatus of the character described which is simple, compact and complete within itself, the several parts of which are capable of being disassembled and nested in compact relation when not desired for use.

A further object is to provide an improved process of controlling the quality of Portland cement concrete which may be performed by the use of a single portable set of equipment, whose operation is based on the buoyancy principle of securing the absolute volume of solid materials; such process beginning with the determination of specific gravity of the ingredients, each separately and in a saturated and surface dry condition and including the determination of the amounts of net material present in the aggregates before the mixing of the concrete.

Finally, this invention includes for one of its objects the production of a method of analyzing the concrete after mixing in order to determine the actual net quantities of water, cement and mineral aggregate present in the mixture.

With these and other objects in view, my invention consists in the methods and processes hereinbefore set forth and in the construction and combination of the various parts of the apparatus, whereby the objects contemplated are attained, as hereinafter more fully set forth, pointed out in my claim, and illustrated in the accompanying drawing, in which:—

Figure 1 is a plan view of a portable apparatus which may be employed for carrying out certain tests and making certain determinations as contemplated by my invention, and more particularly those tests relating to specific gravity determination of fine and coarse aggregates, free moisture determination of fine and coarse aggregates and absorption determinations as well as for carrying out certain steps in the process of determining the constituents of freshly mixed concrete.

Figure 2 is a side elevation of the same, partly in section.

Figure 3 is a vertical section illustrating those portions of the apparatus which are employed in addition to other elements, particularly in making the test for determination of percentage of silt as well as for determining the constituents of freshly mixed concrete.

The tests for which this apparatus is used are:
1—Specific gravity determinations.
   a—For fine aggregates.
   b—For coarse aggregates.
2—Free moisture determinations.
   a—For fine aggregates.
   b—For coarse aggregates.
3—Absorption determination.
4—Percentage of silt or material passing a fine mesh such as No. 100 sieve.
5—Analysis of the constituents of freshly mixed concrete.

When the term "specific gravity" is employed, it is to be understood as signifying the approximate, apparent specific gravity which may differ from actual specific gravity of the materials because of voids, but which is sufficiently accurate for the purposes of the tests and determinations herein contemplated.

The apparatus for determining specific gravity and for performing the first steps in other tests will now be described.

A container 10 is employed which preferably is of cylindrical form and open at its top. This container is used as a receptacle for water in which materials may be weighed and it is provided with an overflow pipe 12 located near its top for the purpose of maintaining a constant water level during all weighings. The water which is thus discharged may be received into another receptacle 14.

The container 10 preferably is provided with means for supporting the weighing apparatus including a socketed lug 16 projecting laterally from the outer surface of its wall and near the bottom thereof an apertured lug 18 above and in line with said lug 16. The lugs 16 and 18 are designed to receive and support in upright position a standard 20 and the lug 18 may be provided with a set screw 22 for engaging and holding said standard firmly in position.

The standard 20 carries at its upper end a sleeve-like support 24 which has a forwardly projecting grooved arm 26.

A scale beam 28 is provided at its center with a knife edge 30 engaging the grooved arm 26 and said scale beam is provided with a calibrated bar 32 on which a rider 34 is slidably mounted. The support 24 also carries a transversely arranged stop bar 36 which has on its respective stop stops 38 for engaging opposite sides of the scale beam 28 to limit its oscillation.

At one end the scale beam 28 carries a shackle 40 which engages a knife edge 42 on the beam. The shackle 40 supports a hanger link 44 from which a bucket 46 is suspended.

On the opposite end of the scale beam 28 is mounted in a similar manner a shackle 48 which pivotally supports a bail 50 carrying a scale pan 52. The equipment includes a plurality of flat bottomed scoops 54 having sloping side walls. The scoops 54 are duplicates in size and weight and one of these scoops is supposed to be present on the scale pan 52 for containing material to be tested and for maintaining the equilibrium of the opposite sides of the scale.

The bucket 46 is designed to contain material such as 56 to be weighed immersed in the water present in the container 10. It preferably is provided with a convex bottom and sloping side walls in order to prevent the trapping of air during the operation of weighing in water.

On the hanger link 44 is permanently mounted a calibration weight 58 which serves to keep the scale beam 28 in balance when the bucket 46 is immersed and empty and scoop 54 is empty. The weight 58 preferably is provided with an upwardly opening recess 60 to receive loose units such as shot for adjusting the balance when necessary. The permanent weight 58 may also be employed as a support for slotted weights 62 which may be provided in any desired number and any desired units of weight measurement such as 1000 grams and which may be placed or removed at pleasure for determining desired quantities of substance in the scoop 54.

The scale beam 28 is provided with a centrally arranged downwardly extending balance finger 64 of considerable length which cooperates with a calibrated dial 66 on the standard 20 for the purpose of indicating whether the parts of the scale are in balance or the contrary.

In Figure 3 there is shown an additional part of the apparatus including a container 68 which preferably is of such size that all members may be conveniently nested therein when not in use.

In connection with the container 68 there is shown a nested or combination sieve including a sieve member 70 having its bottom formed of a standard mesh 72 preferably to constitute what is known as a No. 4 sieve. The sieve member 70 is formed with a lower end portion which is reduced in diameter in order that it may be received within the upper end of a coacting sieve member 74. The latter sieve member has its bottom 76 formed from very fine mesh, preferably constituting what is known as a No. 100 sieve. The sieve member 74 also is formed with a series of openings 78 in its side wall which also are covered with fine mesh of like character to the bottom 76. This arrangement is for the purpose of preventing the clogging of fine materials on the bottom of the sieve and to facilitate its operation.

The apparatus is set up and assembled as shown and described and the scale device is brought to balance with one of the scoops 54 on the scale pan 52. It will be understood that a number of the scoops 54 are employed and that all weighing is done with one of these scoops on the pan 52. The scoops 54 should, of course, never be used except when perfectly clean and dry.

In performing the various tests two kinds of weighings are done, namely—weighing in air and weighing in water or immersed.

The weighing in air of samples to be tested preferably is always done to an even 1000 grams and is accomplished by placing the proper number of weights such as 62 on the permanent weight 58 and bringing the scales to balance with a quantity of material to be tested in the scoop 54 on the opposite side. This scoop with its contents may then be removed and another empty scoop placed on the pan to maintain the balance.

For weighing in water the bucket 46 is partially filled with water and the material to be tested is poured therein, and if the material is fine it should be stirred and allowed to settle before immersing in the container 10, which is filled to the level of the overflow pipe 12.

Test No. I

The first and perhaps the simplest test is the determination of specific gravity of aggregates or Portland cement.

Fine aggregate to be tested is brought to a saturated and surface dry condition preliminary to the test. To accomplish this it may be soaked in water for a period of approximately twenty-four hours and then spread out on a flat surface and allowed to air dry until surface moisture has evaporated. This condition may be determined by the fact that for fine material such as sand the sample will flow freely from a dry trowel or other metal surface. Heat should not be employed for the drying operation, as it will tend to drive out the absorbed moisture.

An exact quantity of the material is then selected, such for example as 1000 grams, by weighing in air as previously described. Then the sample of material is poured into the bucket 46 which has been previously removed from the container 10 and left about one-half full of water. After the material has thoroughly settled the bucket 46 is filled with water and is suspended in the container 10 and weighed immersed. This weighing operation is accomplished by the use of the scale with sufficient weights of graduated sizes and the slide 34.

To compute the specific gravity of the material I employ the formula $$\text{sp gr} = \frac{1000}{1000 - W1}$$

in which the symbol "W1" represents the weight of the material in water. It may be assumed that this weight will remain constant as long as material from the same source is used, but it is best to make occasional check determinations from different shipments.

The method of determining specific gravity of coarse aggregate is substantially the same as just described, but it usually is better to employ a larger representative sample for the test such as a quantity weighing 2000 grams. In order to surface dry the material the individual particles may be wiped with a towel or a specially designed centrifuge may be employed.

It will be understood that the bringing of the material to a saturated and surface dry condition involves considerable nicety of judgment on the part of the operator. After some experience his judgment will be based on the fact that in this condition the material will neither contribute water to nor absorb water from the mixing water used in a batch.

Test No. II is employed for determination of free moisture and is based on the following facts:

If a sample of 1000 grams of air dry sand is weighed immersed in water, it will weigh a certain amount determined by the amount of water the solid material present will displace.

If a 1000 gram wet sample of the same sand is weighed immersed it will weigh less than the dry sand according to the amount of water it contains since there is less solid material present and the water content will weigh nothing when weighed in water.

Also if the sand is less than surface dry or in other words, drier than the original sample to which it is being compared, it will weigh more immersed than the air dry sample because more solid material is present in a given quantity by weight.

It follows, therefore, that the amount of free moisture in the wet sample may be determined from the following formula $$X = (W1 - W2) \times \frac{sp\ gr}{sp\ gr - 1}$$

in which X represents the number of grams of free moisture, W' represents the immersed weight of a given quantity of air dry sand and W2 represents the weight immersed of a similar quantity by weight of wet sand. The symbol sp. gr. is the approximate apparent specific gravity of this material as determined by Test No. I.

A test is figured out by securing a representative sample of sand or other material to be tested and for which the specific gravity has been determined. A suitable quantity such as 1000 grams is weighed in air and then weighed immersed as in the previous test, and the weight thus determined is represented by the symbol W2. Then the amount of free moisture contained in this sample is determined by the use of the formula above given. In this test any sized test sample may be used. However, both W1 and W2 must be values secured from samples of the same weight in air.

Test No. III

This test is for the determination of the absorptive capacity of fine or coarse aggregate when less than surface dry and is identical with the test for free moisture described in Test No. 2, except for one feature. When a tested sample is less than surface dry or in other words, does not contain all of the water it is capable of absorbing, then W2, or the weight of the sample immersed, will be greater than W1, or the weight of an air dry sample of similar material immersed in water. In such case, by using the formula as given under Test No. 2, a negative result will be secured which indicates absorption.

Test No. IV

This method is intended primarily for use in the field for making approximate determinations of the percentage of silt in both fine and coarse aggregates.

A representative sample is selected, bearing in mind that the moisture condition of the sample is unimportant.

The sample is first carefully weighed in air and then is stirred into water in the bucket 46 which is then completely filled and suspended in the container 10 and weighed in water. After this weighing the sample is poured upon a fine sieve and thoroughly washed. This may be accomplished by placing the sample in the sieve member 74 and agitating it in a container such as 68 so that very fine material such as silt will pass through the screen. The residue is then replaced in the bucket 46 and is reweighed immersed.

The percentage of silt in the selected sample equals $$\frac{W1 - Wf}{W1}$$

where W1 represents the original weight and Wf the final weight.

Test No. V

This test is considered to be highly important because it furnishes an accurate and speedy method for making determinations of the relative amounts of water, cement, fine aggregate and coarse aggregate in freshly mixed concrete prior to the initial hardening.

A sample of the fresh concrete is selected from the mixer discharge or from the portion of the work under consideration and this sample should consist of not less than 3000 grams.

The selected sample is carefully weighed in air and then the entire sample is poured into the bucket 46 which has been removed and partially filled with water for this purpose. The sample is stirred to remove air and is allowed to settle, after which the bucket is completely filled with water and is suspended in the container 10 and weighed immersed.

Then the nested sieve members 70 and 74 are employed for separating the constituents of the sample by pouring the sample into the uppermost or coarser sieve member 70 for washing in water in a container such as 68. It is obvious that the cement in the mixture will readily pass through the coarse sieve bottom 72 of the uppermost sieve member and that it will eventually pass through the final or No. 100 sieve constituting the bottom of the lowermost sieve 74. The cement which is thus washed through the nested sieve members is wasted or deposited on the bottom of the container 68 and is represented by the numeral 80. The coarse aggregate of the mixture is retained in the uppermost sieve 70 and is represented by the numeral 82. The fine aggregate passes the No. 4 sieve constituting the bottom of the sieve member 70 and is retained on the No. 100 sieve 76. This fine aggregate or sand is represented by the numeral 84 in Figure 3.

The next step in the process is to return the aggregates 82 and 84 to the bucket 46 and weigh them immersed, care being taken that none of the aggregate shall be lost in handling. This process should be carried out accumulatively, the coarse aggregate being weighed first and then both the fine and the coarse together by pouring the fine aggregate 84 on top of the coarse aggregate 82 in the bucket.

The foregoing procedure completes the test except the computations, but in case the aggregates may be of doubtful specific gravity they may be removed from the bucket and dried as a check of their actual amounts.

The immersed weight of cement in the mixture is determined by subtracting from the immersed weight of the entire mixture the figure representing the immersed weight of the combined aggregates.

The amount of coarse aggregate is represented by the figures obtained by first weighing the coarse aggregate immersed after having been removed from the sieve member 70. The amount of fine aggregate is represented by the difference in weight of the coarse aggregate and the combined coarse and fine aggregate. The actual amounts of material present is represented by the weight immersed, and the weight in air of this material is obtained by multiplying this immersed weight by the specific gravity divided by the specific gravity minus one; such specific gravity value having been determined as previously described. Thus the standard "net" condition being established during the specific gravity determination, the results of analyses present the net quantities in air. The amount of water in the mixture is determined by subtracting the weight of the cement and aggregates from the total weight.

Summary

It will be noted that all of the tests hereinbefore referred to are based on the specific gravities of the various materials. Since the No. 1 test is the first to be performed, this value when obtained is the key to all of the other tests.

By carrying out the various tests herein described it is possible to determine the net amounts of water, cement and aggregates going into a batch of Portland cement concrete, and also the yield or net amount of concrete that the batch will produce in construction work. In other words, it is not necessary to guess at the amount of water which should be added to a mixture in order to obtain the desired results or the proper percentage of moisture because these tests will enable the engineer to determine the exact amount of free moisture in the aggregates and also the absorptive properties of the aggregates to be used.

Moreover, by following the procedure set forth in the No. 5 test an accurate determination may be made as to the constituents of the concrete when mixed.

Although I have referred principally to the testing of aggregates for concrete work, it is to be understood that my invention is not limited to such tests, but that it may be employed in connection with any mineral aggregates. For instance, sand or crushed rock to be used for other purposes may be tested to determine the moisture content. This is desirable particularly when the aggregate is sold on a net basis in which a charge is made for the actual amount of dry material by weight.

In connection with the method constituting my invention I call attention to the following considerations as being of importance in its practice:—

1—The weighing of the ingredient to be tested in an immersed bucket suspended from a balanced arm, said bucket being of solid sheet metal formed with a convex bottom and being of progressively greater diameter from its bottom to its top, whereby sloping sides are formed.

2—The mounting of the scale on a standard which is connected directly to the container which is used for weighing substances immersed, this standard being demountably attached to the container.

3—The weighing of samples to be tested by means of a series of scoops used on one side of the apparatus and the matching of the sample by means of a slotted weight suspended on the other side of the balance arm. Because of this arrangement no other equipment is necessary in determining the weight of the samples.

4—The use of a specially designed sieve for washing cement from the fresh concrete, this being embodied in the sieve member 74 having a standard 100 mesh screen in the side openings 78, as well as in the bottom 76.

5—The inter-relation of the sizes of the scoops 54, the bucket 46, the sieves, the container 10 and the receptacle 68 so that accuracy is facilitated in the handling of tested material and so that all parts may be readily nested and packed within the container 68.

I claim as my invention:—

A process of analyzing freshly mixed cement and other aggregate including the steps of weighing a sample in air, weighing the sample immersed in water, washing the sample through a combination sieve capable of retaining coarse aggregate in one part and capable of retaining fine aggregate in another part but approximately permitting the cement and other aggregate of similar magnitude to pass, then successively weighing the coarse and the combined coarse and fine aggregates immersed in water, determining the immersed weight of cement and other aggregate of similar magnitude in the mixture by subtracting from the total immersed weight of the sample the sum of the immersed weights of the aggregates, determining the weight in air of each solid material present by multiplying its immersed weight by its specific gravity divided by one less than such specific gravity and determining the weight of water present in the original sample by subtracting the weight of solid materials from the total weight of the sample in air.

WALTER M. DUNAGAN.